United States Patent [19]

Shimanaka et al.

[11] Patent Number: 5,150,761

[45] Date of Patent: Sep. 29, 1992

[54] LINE PRESSURE ARRANGEMENT FOR AUTOMOTIVE POWER TRAIN INCLUDING TRACTION COMPANY

[75] Inventors: Shigeki Shimanaka, Hadano; Yuji Kato, Tokyo, both of Japan

[73] Assignee: Nissan Motor Co., Ltd., Japan

[21] Appl. No.: 566,690

[22] Filed: Aug. 14, 1990

[30] Foreign Application Priority Data

Aug. 23, 1989 [JP] Japan ................... 1-216260

[51] Int. Cl.⁵ .............................................. B60K 13/02
[52] U.S. Cl. ................... 180/197; 364/424.1; 364/426.03
[58] Field of Search ............ 180/197; 364/424.1, 364/426.02, 426.03

[56] References Cited

U.S. PATENT DOCUMENTS 4,680,992  7/1987  Hayasaki et al. ................ 74/869
4,722,411  2/1988  Ohashi et al. .................... 180/197
4,730,521  3/1988  Hayasaki et al. .................. 74/867
4,733,760  3/1988  Inagaki et al. ................... 180/197
4,736,728  4/1988  Takahashi et al. ................ 180/197

FOREIGN PATENT DOCUMENTS

62-31769  2/1987  Japan .
62-62047  3/1987  Japan .
1-116353  5/1989  Japan .

Primary Examiner—Charles A. Marmor
Assistant Examiner—A. M. Boehler
Attorney, Agent, or Firm—Lowe, Price, LeBlanc & Becker

[57] ABSTRACT

The opening degrees of a manually operable engine throttle valve and a traction control controlled throttle valve are compared and the opening degree of the one which is closed the most is used to control the level of line pressure in an automatic transmission.

2 Claims, 7 Drawing Sheets

| GEAR \ SOLENOID | SOLENOID 1 | SOLENOID 2 |
|---|---|---|
| FIRST | ON | ON |
| SECOND | OFF | ON |
| THIRD | OFF | OFF |
| FOURTH | ON | OFF |

FIG.7 and more specifically to a line pressure control arrangement which is responsive to the operation of a traction control which modifies the amount of torque produced by an engine associated with an automatic transmission.

LINE PRESSURE ARRANGEMENT FOR AUTOMOTIVE POWER TRAIN INCLUDING TRACTION COMPANY

BACKGROUND OF THE INVENTION

1. Field of the Invention

The present invention relates generally to line pressure control arrangements for automatic automotive transmissions and more specifically to a line pressure control arrangement which is responsive to the operation of a traction control which modifies the amount of torque produced by an engine associated with an automatic transmission.

1. Description of the Prior Art

JP-A-62-31769 discloses a traction control arrangement wherein the output of the engine is varied in accordance with the amount of wheel slip. In this arrangement, first and second throttles are arranged in series in the induction conduit. This so-called tandem throttle valve arrangement is such that one of the throttle valves is controlled in accordance with the amount of accelerator pedal depression while the other is controlled by a traction control system.

JP-A-62-62047 discloses a transmission control arrangement wherein the level of line pressure which is used to engage and disengage the various friction elements of the transmission is varied in accordance with the load on the engine as indicated by the position of the throttle valve, in order to attenuate shift shock.

However, in the event that a shift shock attenuation arrangement of the nature disclosed in JP-A-62-62047 is applied to a transmission which is operatively connected to an engine equipped with a tandem throttle valve type traction control arrangement, a problem may be encountered in that the level of line pressure is controlled only in accordance with the position of the accelerator pedal operated throttle valve. That is to say, in the event that the traction control is active and closes the second throttle valve more than the first accelerator pedal operated one, the amount of torque produced by the engine is lower than that indicated by the position of the first throttle valve and the level of the line pressure is controlled to a level which is higher than suited for the amount of torque actually being produced by the engine. This results in the engagement of the transmission friction elements being controlled in a manner which invites the generation of shift and selection shocks.

SUMMARY OF THE INVENTION

It is an object of the present invention to provide a system which controls the level of line pressure to one suited to the actual amount of torque being generated by an engine equipped with a tandem type throttle valve arrangement.

In brief, the above object is achieved by an arrangement wherein the opening degrees of a manually operable engine throttle valve and a traction control controlled throttle valve are compared and the opening degree of the valve which is closed the most is used to control the level of line pressure in an automatic transmission.

More specifically, a first aspect of the present invention comes in the form of an automotive power train which features: an internal combustion engine, the internal combustion engine having an induction passage in which first and second serially arranged throttle valves are disposed, the first throttle valve being responsive to the amount of displacement of a manually operable member, the second throttle valve being operatively connected a servo device; traction control means for controlling the operation of the servo in accordance with selected operational parameters which are indicative of traction loss and the presence of wheel slip; to adjust the amount of torque being generated by the engine, to thereby improve vehicle traction a transmission operatively connected with the internal combustion engine, the transmission including a source of selectively variable line pressure, the variable line pressure source being arranged to be responsive to an input indicative of the engine torque whereby selective application of the line pressure allows selection from four and one reverse gear ratios; a transmission control unit, the control unit being operatively connected with the traction control means and a sensor which detects the opening degree of the first throttle valve; and total throttle sensing means for determining which of the first and second throttle valves is closed the most and for supplying an input indicative of engine torque to the line pressure source in accordance with the opening degree of the throttle valve which is closed the most, the total throttle opening sensing means being included in the transmission control unit.

A second aspect of the present invention comes in the form of an automotive power train which features: an internal combustion engine and an induction conduit which leads to the engine; a manually controlled first throttle valve disposed in the induction conduit; a servo controlled second throttle valve disposed in the induction conduit at a location downstream of the first throttle valve; traction control means including wheel speed sensors for producing signals from which the presence of wheel slip can be determined, the traction control means being arranged to control a servo device with which the second throttle valve is controlled; an automatic transmission, including a controllable source of variable line pressure; a transmission control unit, the transmission control unit including a line pressure control means which determines the required level of line pressure which should be produced by the source of variable line pressure based on an input indicative of engine load to determine which one of four available forward speeds to utilize; and total throttle sensing means responsive to the operation of the traction control means and a sensor which senses the opening degree of the first throttle valve, for determining which of the first and second throttle valves is closed the most and for supplying an input indicative of engine load to the line pressure control means based on the opening degree of the throttle valve which is closed the most.

DETAILED DESCRIPTION OF THE PREFERRED EMBODIMENTS

Figure 1:
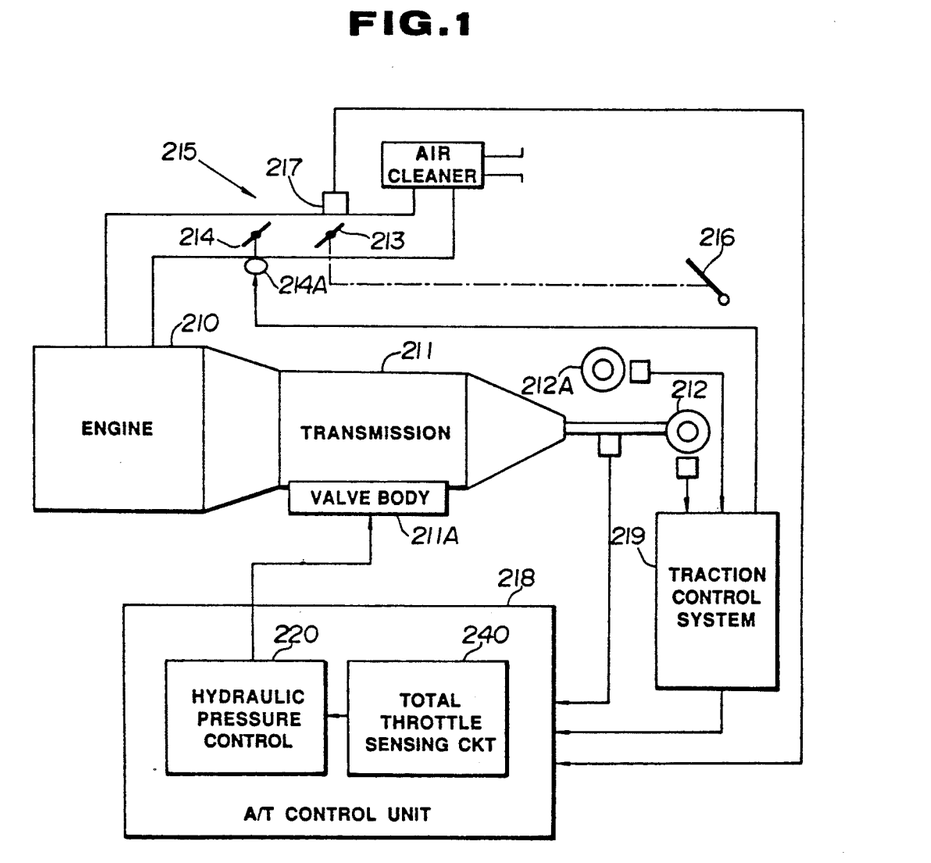
FIG. 1 is a schematic diagram illustrating the application of a line pressure control system to an automotive power train which is provided with a tandem throttle valve type traction control arrangement.

FIG. 1 shows an engine/transmission power train arrangement to which the present invention is applied. In this arrangement an engine 210 is operatively connected to an automatic transmission 211 by way of a torque converter.

The induction conduit includes first and second throttle valves 213, 214 which define a so called "tandem" throttle valve arrangement 15. The first throttle valve 213 is operatively connected to a manually operable member such as an accelerator pedal 216. A throttle position sensor 217 is operatively connected with the first throttle valve to sense the opening degree of the same and the output a signal indicative of the sensed position to a A/T control unit 218.

A traction control system 219 is operatively connected with wheel speed sensors which are schematically represented at 212 and 212A. In this instance, the sensor 212 is arranged to sense the rotational speed of the rear wheels while sensor 212A is arranged to sense the rotational speed of those at the front of the vehicle. Merely by way of example, the vehicle in this instance is assumed to a F-R type (viz., front engine-rear wheel drive type).

It should be noted that a particular arrangement of the wheel speed sensors and the drive train is not of great importance and that any suitable slip detection arrangement may be used in connection with F-R (front engine rear wheel drive), M-R (mid engine rear wheel drive), F-F(front engine front wheel drive) 4WD (four wheel drive), etc., type vehicles.

The traction control system 219 is arranged to determine the amount of slip and to issue a control signal to the servo 214A in the event that the amount of torque which is being generated by the engine need to be reduced in order to improve vehicle traction.

Figure 2:
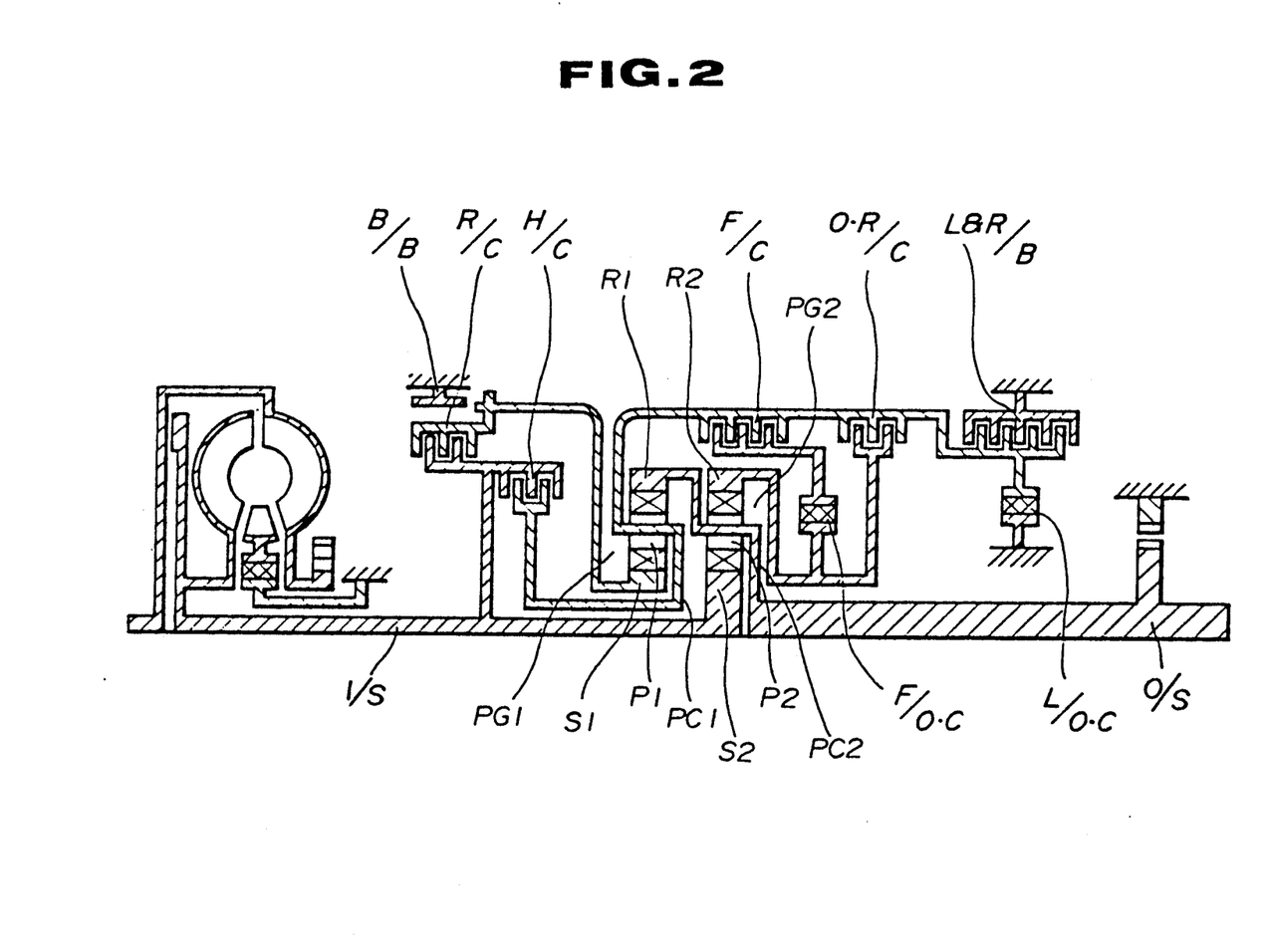
FIG. 2 is a sectional view illustrating an example of the gear train included in the transmission shown in FIG. 1.

As shown in FIG. 2, the transmission 211 in this instance comprises first and second planetary gear units PG1 and PG2 which are arranged in tandem. As shown, the forward planetary gear PG1 comprises a front sun gear S1, front pinion gears P1, a front internal or ring gear R1 and a pinion gear carrier PC1. The rear planetary gear similarly comprises a sun gear S2, front pinion gears P2, a front internal or ring gear R2 and a pinion gear carrier PC2.

A transmission input shaft I/S is arranged to be selectively connectable with the front sun gear S1 by way of a reverse clutch R/C, and selectively connectable with the front pinion gear carrier PC1 by way of a high clutch H/C.

The front planetary gear carrier PC1 is selectively connectable with the rear ring gear R2 by way of a forward clutch F/C; the front sun gear S1 is connectable with the transmission housing through a band brake B/B, the front carrier PC1 is selectively connectable with the transmission housing through a low and reverse brake L&R/B.

In addition to this, a forward overrunning clutch F/O is arranged between the forward clutch F/C and the rear ring gear R2; while a low overrunning clutch L/O is arranged between front planetary gear carrier PC1 and the transmission housing. An overrunning clutch O.R/C is to provide a selective connection between front planetary gear carrier PC1 and the rear ring gear S2 and is arranged in parallel with the F/O.C.

Figure 7:
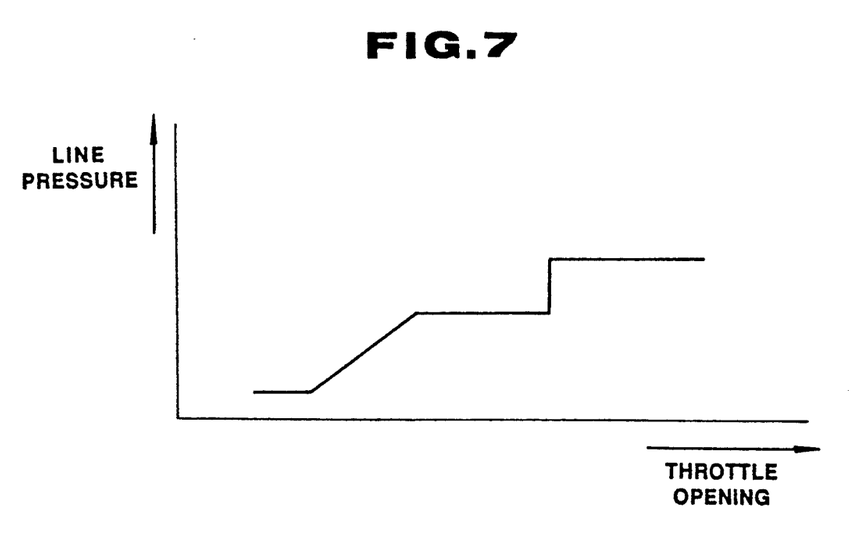
FIG. 7 is a chart which shows in terms of line pressure and throttle opening an example of the line pressure control which is provided during normal transmission operation.

By selectively supplying the above mentioned friction elements with line pressure in accordance with the table shown in FIG. 7, a plurality (4) of, e.g. four forward speeds and one reverse gear ratios can be selectively produced. In this table, the circles denote the friction elements which are supplied with the above mentioned line pressure.

It should be also noted that with the gear train illustrated in FIG. 2 the forward overrunning clutch F/O.C is arranged such that when the front planetary gear carrier PC1 and the rear ring gear R2 are prevented from rotating in the opposite direction from one another.

Figure 4:
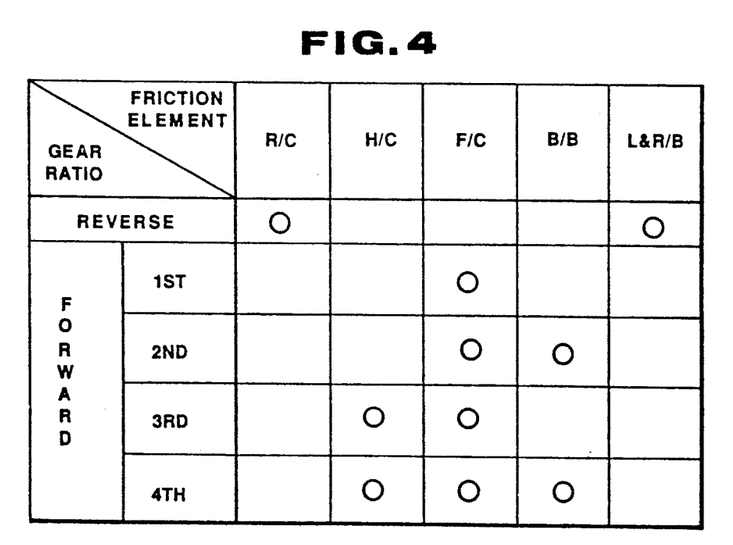
FIG. 4 is a table illustrating the relationship between the friction elements and the gears which are produced by the engagement of the same.

It should also be noted that, even though it is not shown in the table in FIG. 4, when the above mentioned overrunning clutch O.R/C is engaged, the function of the forward overrunning clutch is negated and engine braking is rendered possible.

The input shaft I/S is operatively connected with the crankshaft of the engine through a torque converter T/C.

It should be noted that the above mentioned friction elements are selectively controlled by a valve body 211A. This valve body 211A houses a plurality of spool valves, accumulators and orifice arrangements which are arranged to control the supply of hydraulic line pressure to the servos of the above listed friction elements. By way of example only, the valve body 211A may comprise three solenoid valves, two of which control the shifting of the transmission and the other which controls the level of line pressure.

For disclosure relating to such a type of arrangement, reference may be had to U.S. Pat. No. 4,730,521 issued on Mar. 15, 1988 in the name of Hayasaki et al and to U.S. Pat. No. 4,680,992 issued on Jul. 21, 1988 in the name of Hayasaki et al. Reference may also be had to copending U.S. Pat. application Ser. No. 07/336,430 filed on Apr. 11, 1989 in the name of Narita.

In brief, this latter-mentioned application discloses an arrangement wherein, during non-shift (non-transitory) modes of transmission operation, the line pressure is controlled according to a first control schedule. Upon a shift being initiated, a second control schedule is used. The use of this second schedule is maintained until such time as the ratio of the transmission input shaft rotational speed to the transmission output shaft rotational speed reaches a predetermined limit, whereafter a third control schedule is utilized. Control is switched from the third control schedule to the first one upon the expiration of a predetermined period which is timed from the point in time when a decision that a shift between gears of the transmission should be implemented.

Figure 3:
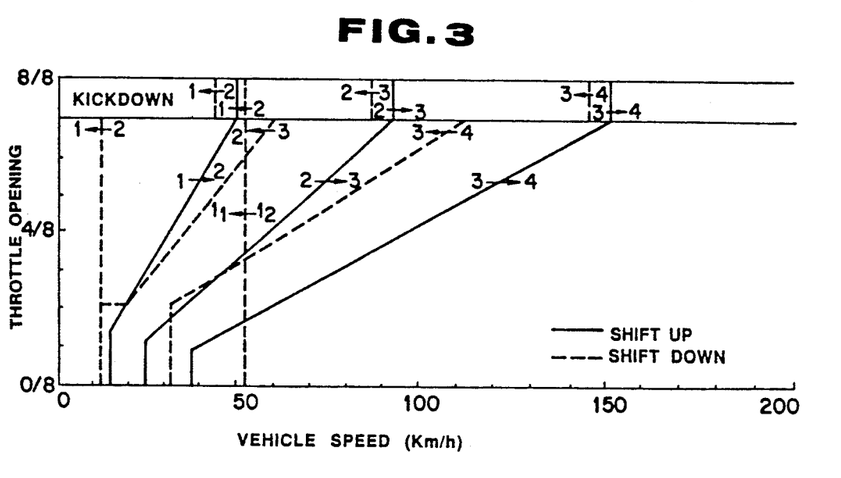
FIG. 3 is a shift schedule according to which the the transmission shown in FIG. 2 is controlled.

In the instant embodiment, the shifting control is arranged to follow the schedule depicted in FIG. 3 and is such as to produce four forward gears and one reverse gear by engaging the friction elements in the manner shown in FIG. 4. It should be noted that in FIG. 4. the circles indicate which friction elements are engaged to produce the respective gear ratios.

Figure 5A:
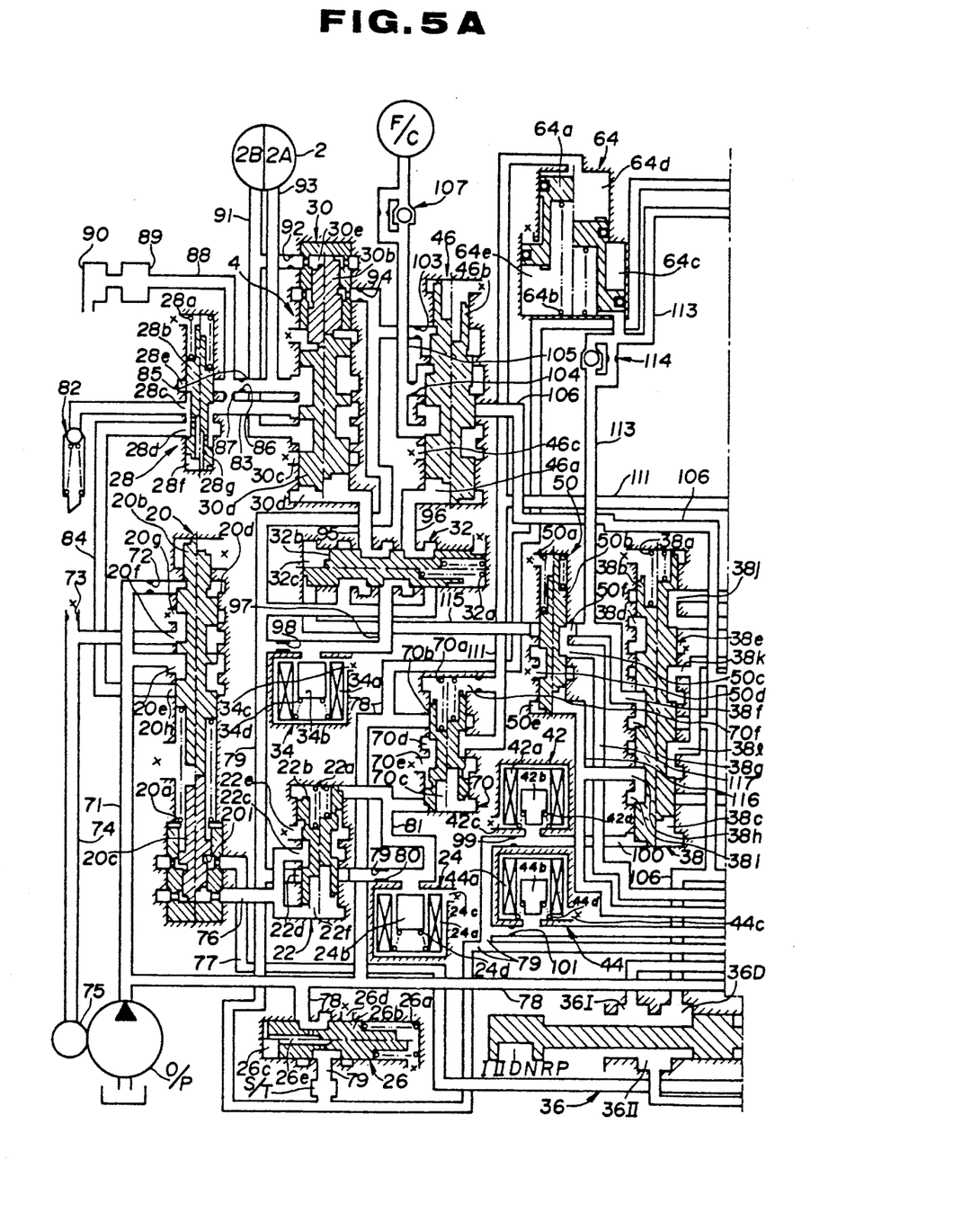
FIGS. 5A and 5B show a hydraulic spool valve control system utilized to control the transmission gear train shown in FIG. 2.
Figure 5B:
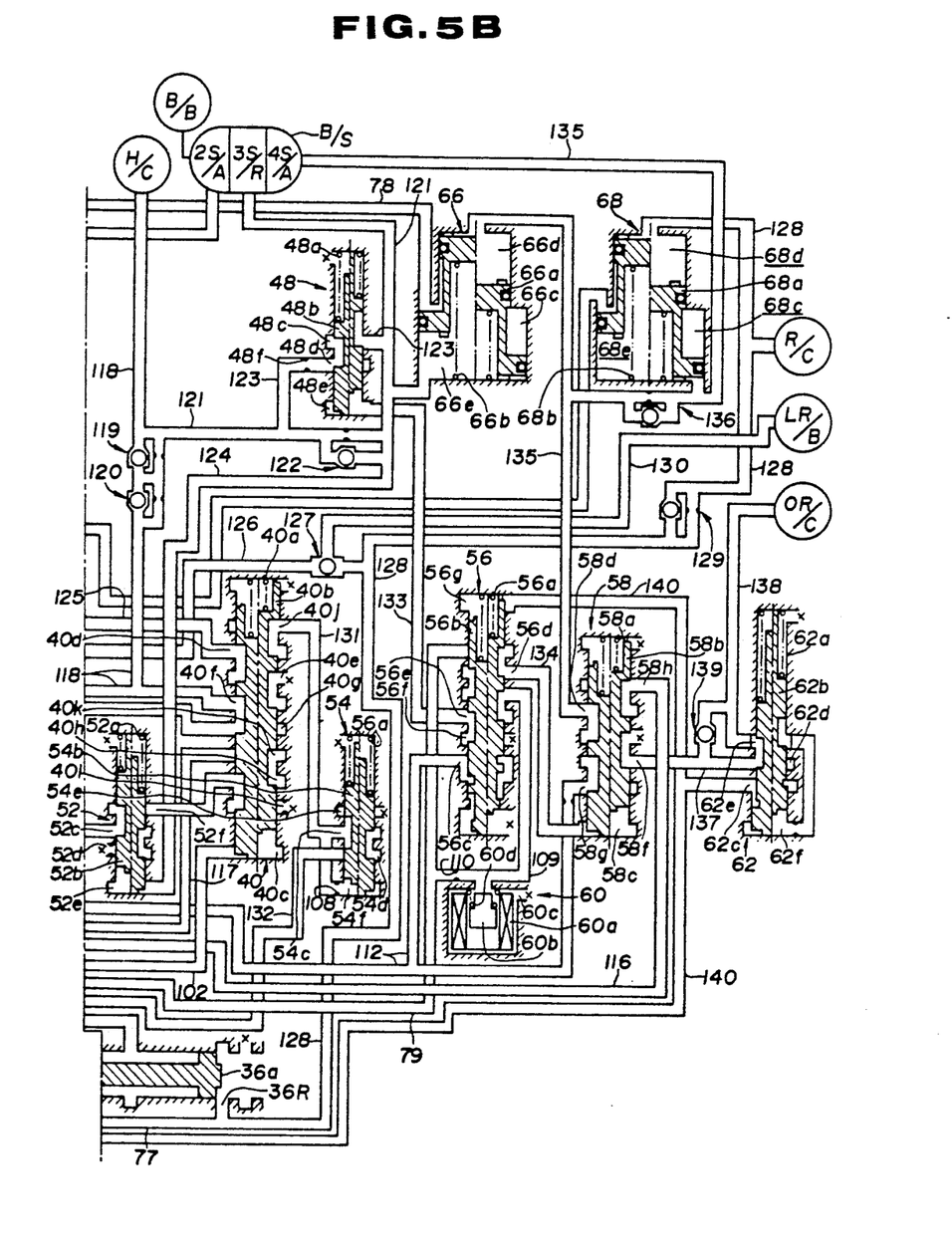

FIGS. 5A and 5B show details of the control circuit which is included in the valve body 211A of the instant embodiment. This circuit includes a pressure regulator valve 20, a pressure modifier valve 22, aline pressure solenoid valve 24, a pilot valve 26, a torque converter regulator valve 28, a lock up control valve 30, a shuttle valve 32, a lock up solenoid 34, a manual valve 36, a first shift valve 38, a second shift valve 40, a first shift solenoid valve 42, a second shift solenoid valve 44, a forward clutch control valve 46, a 3-2 timing valve 48, a 4-2 relay valve 50, a 4-2 sequence valve 52, a first range pressure reduction valve, a shuttle valve 56, an overrunning clutch control valve 58, a third shift solenoid valve 60, an overrunning clutch pressure reduction valve 62, a second speed servo apply pressure accumulator 64, a third speed servo release pressure accumulator 66, a fourth speed servo apply pressure accumulator 68, and an accumulator control valve 70.

In the above described type of transmission, the servo B/S of band brake B/B is constructed in a manner wherein irrespective of the supply of line pressure into a second speed servo apply chamber 2S/A, upon pressurization of a third speed release chamber 3S/R, the band brake is conditioned to assume a released state. Further, irrespective of the pressures prevailing in the 2S/A and 3S/R chambers, upon supply of line pressure into a fourth speed apply chamber 4S/A the band brake is applied.

The switching of the first and second shift valves 38, 40 is controlled by selectively conditioning the first and second shift control solenoids 42, 44 to assume ON and OFF states. When conditioned to assume the ON states, the control solenoids 42, 44 permit a pilot pressure to be supplied to the shift valves which accordingly assume the upshift positions indicated by the right hand half sections of the respective spools. When conditioned to assume the OFF state, the control solenoids permit the pilot pressure which is applied to the bottom of the spools to be drained and the shift valve spools are permitted to lower to their respective downshift positions.

Figure 6:
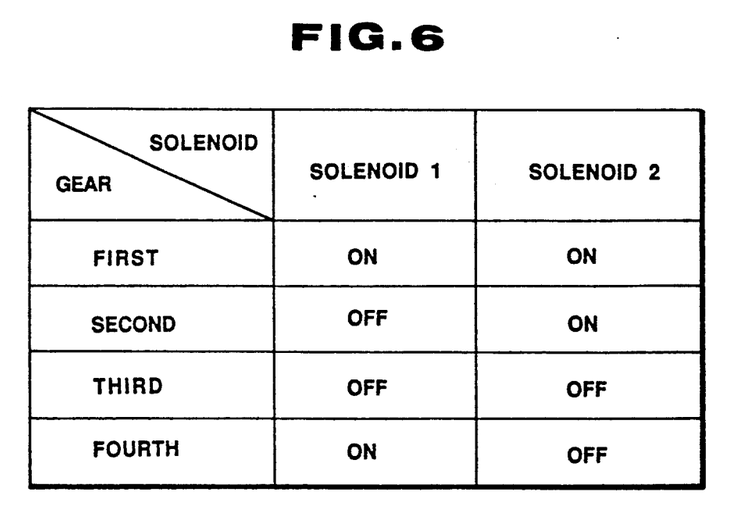
FIG. 6 is a table which shows the manner first and second shift control solenoids are energized in order to produce first to fourth forward gear ratios.

The combinations of solenoid energizations which induces the transmission to assume first to fourth forward speeds is shown in FIG. 6. The change in energization statuses of the solenoids 42, 44 is induced in accordance with the shift schedule shown in FIG. 3. Hence when a vehicle speed/engine load coordinate reaches a shift line, a shift control routine determines which shift is required and selects the particular solenoid energization pattern which is required to cause the transmission to be conditioned to produce the newly required gear ratio.

The output of an oil pump O/P which is driven by the engine 210, is supplied to pressure regulator valve 20 which regulates the pump pressure and outputs a line pressure into the control circuit.

In this instance the pressure regulator valve 20 includes a pressure differential area which is exposed to the pump discharge pressure which is supplied via orifice 72 and arranged to produce a bias which acts downward as seen in the drawings. A spring 20a produces a bias which acts against the produced by the pressure which is applied to the above mentioned pressure differential area. Modifier pressure which is supplied via conduit 76 acts on the plug 20c in a manner to bias the same upward (as seen in the drawings). The level of line pressure varies with the equilibrium in the forces which are produced.

The level of the modifier pressure is controlled by a solenoid valve 24 which controls the operation of the pressure modifier valve 22. In this case, depending on the duty of the signal applied to the solenoid valve 24, the amount of pilot pressure which is permitted to be drained is controlled. In this instance, the solenoid 24 is of the type that opens the drain when energized (ON).

Accordingly, by controlling the signal which is applied to the line pressure control solenoid 24 the level of line pressure can be controlled between minimum and maximum values.

In this arrangement, under normal modes of operation, the level of the line pressure is controlled in the manner indicated in FIG. 7. That is to say, the level of the line pressure is stepwisely increased as the sensed throttle valve opening degree increases.

In accordance with the present invention, the A/T control unit 218 further includes circuitry 240 which is responsive to the output of throttle valve position sensor 217 (which indicates the opening of the first throttle valve 213) and to a signal indicative of the amount by which the servo 214A is conditioned to close the second throttle valve 214. The total throttle sensing circuit 240 is arranged to determine which of the two throttle settings is the lowest and output a signal indicative of the same to the hydraulic pressure control circuitry 220. The latter mentioned circuitry then controls the level of line pressure in accordance with the line pressure control schedule shown in FIG. 7.

In accordance with this control, the level of line pressure is controlled to that which matches the instant engine load.

Figure 8:
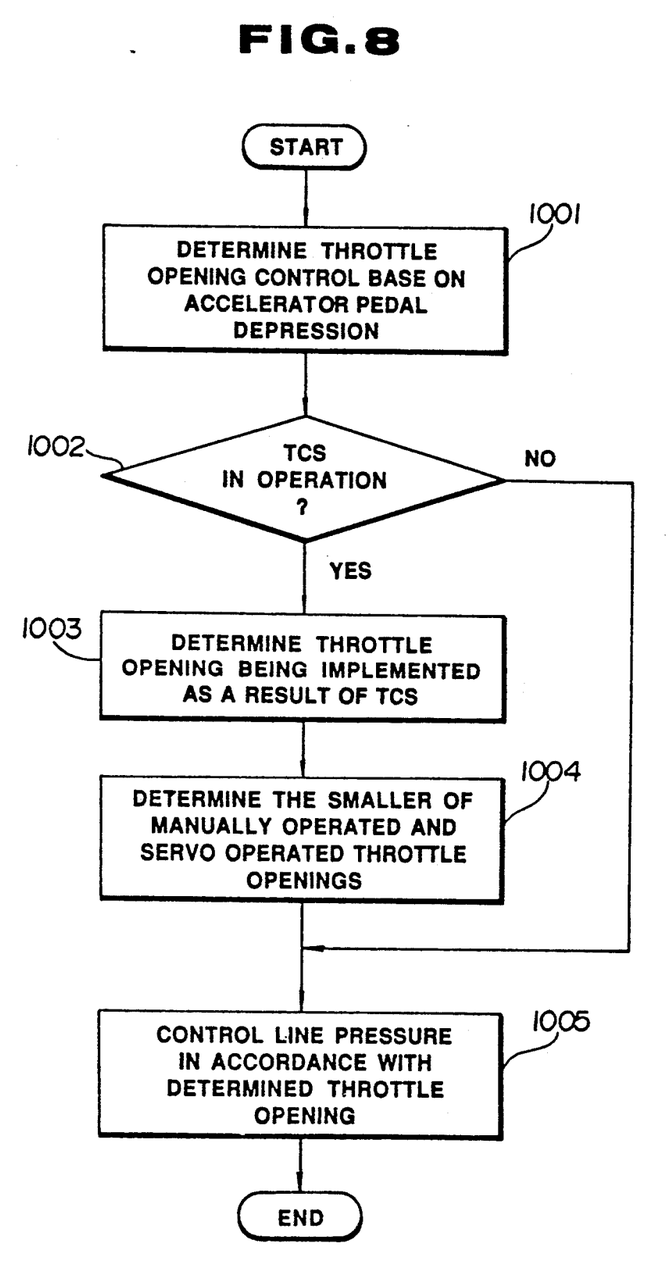
FIG. 8 is a flow chart depicting the steps which are executed during the operation of an embodiment of the present invention.

This control concept will become more clearly appreciated from the following discussion of the flow chart shown in FIG. 8. The routine which is depicted in this flow chart is arranged to be run at predetermined intervals (e.g., at 10 msec intervals).

The first step of this routine is such as to determine the opening degree of the first throttle valve 213 which is being induced by the accelerator pedal depression. At step 1002 it is determined if traction control is being implemented or not. If no traction control is being currently required, the routine by-passes steps 1003 and 1004 and goes directly to step 1005. In the event that the routine follows this course, the level of the line pressure is controlled in accordance with the opening degree of the first throttle valve 213. The reason is that in the absence of any activity by the traction control system (TCS) it can be assumed that the second throttle valve 214 has been conditioned to assume a fully open position and the instant level of engine torque is being determined by the opening degree of the first throttle valve. In other words, under these conditions it can be assumed that the opening degree of the first throttle valve 213 is equal to or less than that of the second one 214.

However, in the event that some traction control is being implemented, the routine flows to step 1003 wherein the amount of throttle closure which the second throttle valve is being induced to undergo is determined by reading the data input from the traction control system 219. At step 1004 which of the two throttle settings is the smaller is determined. For example, if the driver has released the accelerator pedal 216 and is applying the brake, then the setting of the first throttle valve 213 will be smaller than the second 214. Under such conditions, the line pressure control should be controlled in accordance with the setting of the first throttle valve 213 irrespective of the amount by which the TSC has close the second throttle valve 214. On the other hand, if the driver is depressing the accelerator pedal in a manner which demands more torque output from the engine than is determined as being appropriate for the instant wheel slip conditions, the setting of the second throttle valve 214 will be less than that of the first one 213. Under such conditions, the level of the line pressure should be controlled based on the setting of the second throttle valve 214.

At step 1005 in this instance, the level of the line pressure is controlled in accordance with the setting of the throttle valve which is determined to be the smaller of the two. In other words, step 1005 is such as to respond to the input which is supplied on each run. If the TCS is not active the input takes the form of the determination which is made in step 1001. On the other hand, if the TCS is active then control is implemented in accordance with the selection made in step 1004.

Accordingly, the level of the line pressure is controlled in accordance with the total amount of throttling being effected by the tandem system.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An automotive power train, comprising:
   an internal combustion engine, said internal combustion engine having an induction passage in which first and second serially arranged throttle valves are disposed, the first throttle valve being responsive to the amount of displacement of a manually operable member, the second throttle valve being operatively connected to a servo device;
   traction control means for controlling the operation of said servo device in accordance with selected operational parameters which are indicative of traction loss and the presence of wheel slip to adjust the amount of torque being generated by the engine, to thereby improve vehicle traction;
   a transmission operatively connected with said internal combustion engine, said transmission including a source of selectively variable line pressure, the variable line pressure source being arranged to be responsive to an input indicative of the engine torque whereby selective application of the line pressure allows selection from four forward and one reverse gear ratios;
   a transmission control unit, operatively connected with said traction control means and a sensor which detects the opening degree of the first throttle valve; and
   total throttle sensing means for determining which of said first and second throttle valves is closed the most and for supplying an input indicative of engine torque to said line pressure source in accordance with the opening degree of the throttle valve which is closed the most, said total throttle opening sensing means being included in said transmission control unit.

2. An automotive power train, comprising:
   an internal combustion engine;
   an induction conduit which leads to said engine;
   a manually controlled first throttle valve disposed in said induction conduit;
   a servo controlled second throttle valve disposed in said induction conduit at a location downstream of said first throttle valve;
   traction control means for adjusting an amount of torque generated by the engine to thereby improve vehicle traction, including wheel speed sensors for producing signals from which the presence of wheel slip can be determined, said traction control means being arranged to control a servo device with which said second throttle valve is controlled;
   an automatic transmission, including a controllable source of variable line pressure;
   a transmission control unit, comprising line pressure control means for determining a required level of line pressure which should be produced by the source of variable line pressure based on an input indicative of engine load to determine which one of four available forward speeds to utilize; and
   total throttle sensing means, responsive to the operation of said traction control means and a sensor which senses the opening degree of said first throttle valve, for determining which of the first and second throttle valves is closed the most and for supplying an input indicative of engine load to the line pressure control means based on the opening degree of the throttle valve which is closed the most.

* * * * *